United States Patent
Shahrivar

(10) Patent No.: US 12,463,987 B1
(45) Date of Patent: Nov. 4, 2025

(54) APPLICATION-LEVEL CYBERSECURITY USING MULTIPLE STAGES OF CLASSIFIERS

(71) Applicant: Rapid7, Inc., Boston, MA (US)

(72) Inventor: Pojan Shahrivar, Stockholm (SE)

(73) Assignee: Rapid7, Inc., Boston, MA (US)

( * ) Notice: Subject to any disclaimer, the term of this patent is extended or adjusted under 35 U.S.C. 154(b) by 88 days.

(21) Appl. No.: 17/939,308

(22) Filed: Sep. 7, 2022

(51) Int. Cl.
H04L 9/40 (2022.01)

(52) U.S. Cl.
CPC .......... *H04L 63/1416* (2013.01); *H04L 63/20* (2013.01)

(58) Field of Classification Search
CPC ............................ H04L 63/1416; H04L 63/20
See application file for complete search history.

(56) References Cited

U.S. PATENT DOCUMENTS

| | | | |
|---|---|---|---|
| 10,728,265 B2 | 7/2020 | Hayden et al. | |
| 11,005,860 B1* | 5/2021 | Glyer | H04L 41/064 |
| 11,403,413 B2* | 8/2022 | Ojha | G06N 20/00 |
| 2008/0319932 A1* | 12/2008 | Yih | G06Q 10/06 706/20 |
| 2015/0188941 A1* | 7/2015 | Boshmaf | H04L 63/1441 726/22 |
| 2017/0142138 A1* | 5/2017 | Williams | H04L 63/1416 |
| 2019/0141058 A1* | 5/2019 | Hassanzadeh | H04L 41/0631 |
| 2019/0188065 A1* | 6/2019 | Anghel | G06F 11/0778 |
| 2019/0230107 A1* | 7/2019 | De Sapio | H04L 63/145 |
| 2019/0372934 A1* | 12/2019 | Yehudai | G06F 18/2321 |
| 2020/0252428 A1 | 8/2020 | Gardezi et al. | |
| 2020/0336506 A1 | 10/2020 | Levin et al. | |
| 2021/0136089 A1 | 5/2021 | Costea et al. | |
| 2022/0038490 A1* | 2/2022 | Thakur | H04L 63/1425 |
| 2022/0147622 A1 | 5/2022 | Chesla | |
| 2022/0263860 A1 | 8/2022 | Crabtree et al. | |
| 2024/0039927 A1* | 2/2024 | Narayan | H04L 63/145 |

\* cited by examiner

*Primary Examiner* — Viet D Vu
(74) *Attorney, Agent, or Firm* — Ashwin Anand; Lei Sun

(57) ABSTRACT

Various embodiments include systems and methods to implement a security platform providing application-level cyberattack detection using multiple stages of classifiers. The security platform may use requests received by a web service to determine training data to train one or more machine learning models. The training data may be determined by instrumenting an application, such as a web service, with a first stage classifier to determine security events indicative of cyberattacks. The security platform may train machine learning models using aggregations of security events over various periods of time. The machine learning models may serve as second stage classifiers for the security platform.

17 Claims, 11 Drawing Sheets

700

Determine, based on at least one classifier associated with a compute resource, a first stage of classifiers that receive requests directed to the compute resource.
710

Determine, based on a plurality of periods of time, a plurality of security event datasets indicative of cyberattacks detected by the first stage of classifiers.
720

Determine, based on the plurality security event datasets, a plurality of training datasets.
730

Determine, based on the plurality of training datasets, a plurality of classifiers.
740

Determine, based on the plurality of classifiers, a second stage of classifiers that operate on respective security event datasets.
750

Determine one or more access attempts of a compute resource, where a first stage classifier is associated with the compute resource.
810

Determine, based on the first stage classifier operating on the one or more access attempts, a plurality of security event datasets indicative of one or more cyberattacks associated with a plurality of periods of time.
820

Determine, from among a plurality of second stage classifiers, a second stage classifier associated with a first period of time among the plurality of periods of time.
830

Determine, based on the second stage classifier operating on a security event dataset associated with the first period of time, a cyberattack on the compute resource, where the security event dataset is among the plurality of security event datasets.
840

*FIG. 8*

APPLICATION-LEVEL CYBERSECURITY USING MULTIPLE STAGES OF CLASSIFIERS

BACKGROUND

Many companies operate computer environments that are connected to public networks such as the internet. While such connections allow users to access resources on public networks, they also expose a company network to cyberattacks. Cyberattacks may obtain sensitive information, gain control of the company's computing systems, or damage company resources. To prevent cyberattacks, security management systems have become increasingly important to protect private company networks against these types of vulnerabilities.

BRIEF DESCRIPTION OF THE DRAWINGS

FIG. 7 is a flowchart that illustrates an example of a security platform using multiple stages of classifiers to determine a cyberattack, according to some embodiments.

FIG. 8 is a flowchart that illustrates an example of a security platform using multiple stages of classifiers to determine a cyberattack, according to some embodiments.

Figure 1:
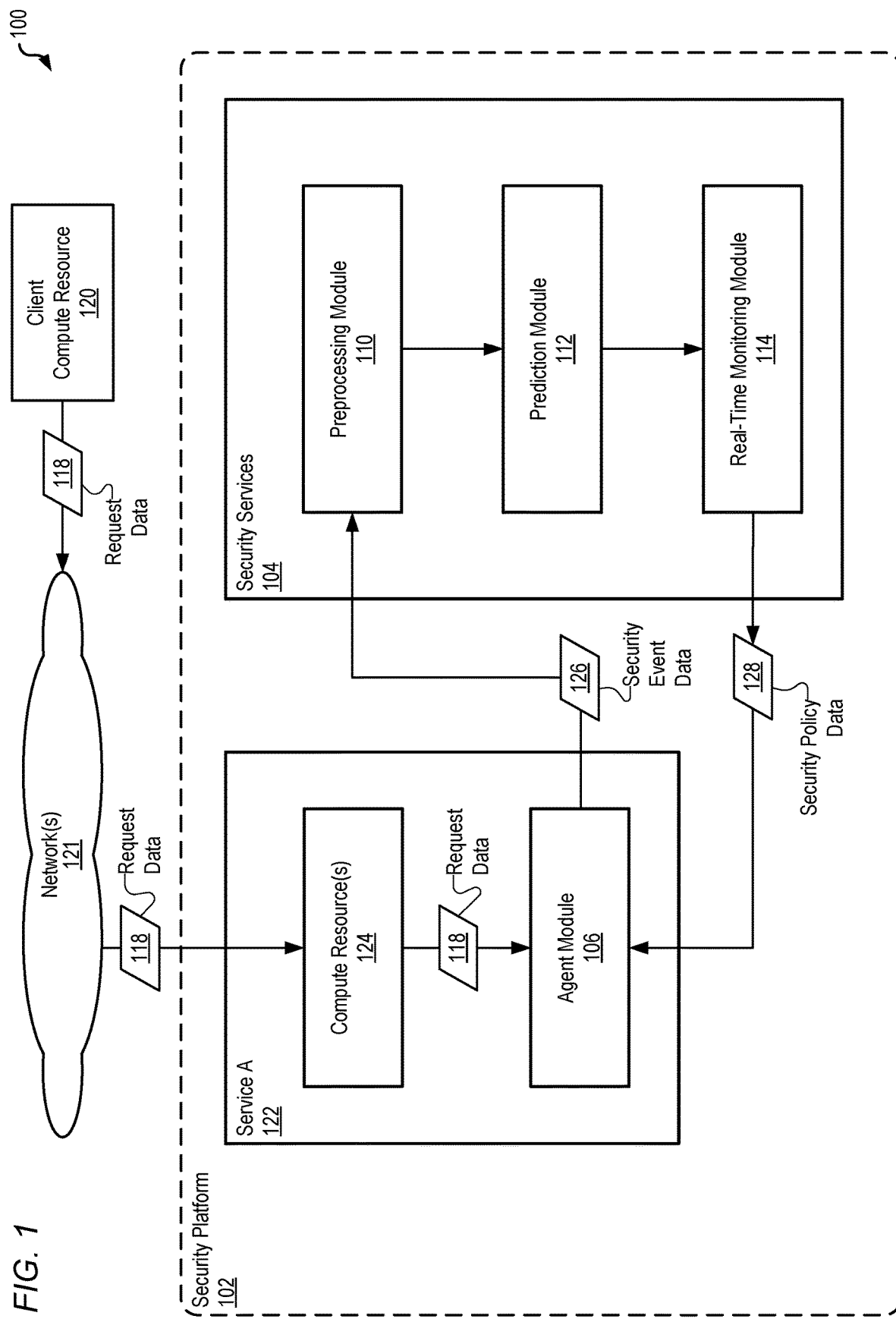
FIG. 1 is a block diagram illustrating a security platform using multistage cyberattack detection, in accordance with some embodiments.

While embodiments are described herein by way of example for several embodiments and illustrative drawings, those skilled in the art will recognize that embodiments are not limited to the embodiments or drawings described. It should be understood that the drawings and detailed description are not intended to limit embodiments to the particular form disclosed, but on the contrary, the intention is to cover all modifications, equivalents and alternatives falling within the spirit and scope as defined by the appended claims. As used throughout this disclosure, the word "may" is used in a permissive sense (i.e., meaning "having the potential to"), rather than the mandatory sense (i.e., meaning "must"). Similarly, the words "include," "including," and "includes" mean "including, but not limited to".

DETAILED DESCRIPTION OF EMBODIMENTS

As disclosed, a security platform may implement a cyberattack detection system that includes multiple stages of classifiers. A first stage may use a classifier to determine a security event based on a single request from a computing device for one or more services from an application. A second stage may comprise a plurality of classifiers to determine a cyberattack, where the plurality of classifiers base a determination on security event data that may aggregated over various periods of time. In some implementations, a first stage may include classifiers based on thresholds, heuristics, or textual analysis, and a second stage may include classifiers comprising one or more machine learning models.

In some implementations, the security platform, based on using multiple stages of threat detection, may drastically increase a scale of requests or access attempts that may be analyzed in real time. For example, a first stage may implement a high-performance classifier, where performance may be balanced against classifier accuracy. In this way, while the first stage classifier may have a large number of false positive classifications, the first stage classifier may analyze large numbers of requests. The false positives may be overcome by having more accurate classifiers within a second stage.

As disclosed, a security platform may determine security data descriptive of the security posture of one or more assets within a client network. For example, the security platform may determine security data descriptive of access attempts directed at one or more compute resources. A compute resource may be a web application, a network device, or some other type of compute resource that provides an accessible service or a network access point.

In traditional approaches, security solutions for detecting cyberattacks may use approaches that rely on a single type of analysis. A single analysis may be based on a statistical analysis, textual analysis, machine learning models, or some other type of classifier. However, such approaches may have the disadvantage of trading performance for scale, or trading accuracy for performance.

As disclosed, the security platform may implement application-layer intrusion detection and prevention. As one example, web applications may be frequently attacked by vulnerability scanning tools that may be downloaded and used by unskilled attackers. The security platform may detect cyberattacks, such as vulnerability scan attacks, and develop security policies for preventing subsequent cyberattacks based on one or more properties of a detected cyberattack. Such security policies may allow for quicker identification of subsequent cyberattacks and for initiating remediation efforts.

In some implementations, the security platform may receive security data from sensors embedded inside application code for a service or application being monitored for cyberattacks. For example, the application code may be instrumented to provide multiple detection points that may determine security events based on an analysis of requests directed to the service or application. Security events may be aggregated and classified by one or more machine learning models. A security event may indicate that a given request may possibly be associated with a cyberattack.

Continuing this example, the one or more machine learning models may determine whether sets of the security events are indicative of a cyberattack. A set, or aggregation, of security events may include security events detected over a particular period of time, such as 1 second, 5 seconds, 5 minutes, or some other period of time. In this example, the first stage of threat detection may include the instrumented code and a second stage of threat detection may include one or more machine learning models.

In some implementations, the security platform may include multiple stages of threat detection that are customized for a given type of application. For example, for each application among a plurality of applications, the security platform may implement a respective agent that monitors requests. Each respective agent may determine security events at a first stage. At a second stage, security events associated with a given application may be used by respective machine learning models that are associated with the given application. In this way, the security platform may determine security policies for individual applications that are more accurate than security policies that are based on security events for different types of applications.

An advantage of the disclosed security platform is that cyberattacks may be more accurately identified, which prevents notification fatigue in users that may otherwise disable security measures. Based on improved detection times, the security platform may more quickly implement remediation responses that may include updated security policies that prevent cyberattacks similar to detected cyberattacks. Quicker remediation responses may reduce or eliminate any negative consequences that may result from a successful cyberattack.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

FIG. 1 depicts an example computing environment 100 that illustrates various components of a security platform using multistage cyberattack detection, in accordance with some embodiments.

As described in this disclosure, for clarity, some steps are attributed to certain modules, in other examples, the steps, a subset of steps, or similar steps, may be performed in different orders or by different modules, or entirely by the security platform 102 without a modular delineation.

In some implementations, the security platform 102 may detect a cyberattack on one or more services or assets by using multistage cyberattack detection. A cyberattack may be any unauthorized access, or any malicious access attempt, with respect to a compute resource. In this example, a service may be a web application. An asset may be any compute resource that is accessible over a network.

In some implementations, the security platform 102 may provide security services, where the security services may be implemented by security services 104 and one or more agent modules 106. In this example, the security platform 102 may comprise a first stage and a second stage. The first stage may comprise the one or more agent modules 106. The second stage may comprise a preprocessing module 110, a prediction module 112, and a real-time monitoring module 114. The prediction module 112 may comprise one or more classifiers, where the classifiers may be trained machine learning models.

In this example, the first stage may comprise a classifier that determines, for one or more requests, whether a given request is indicative of a cyberattack. In some implementations, the agent module 106 may monitor network traffic that is received from one or more client computers. The network traffic may comprise a request for services, data, access, or some other compute resource.

As a first example, a service, such as service A 118, may be instrumented with sensors embedded within software that implements the service. The sensors may include one or more detection points that generate security events for requests that are classified as a possible cyberattack. For example, the agent module 124 may comprise one or more classifiers that determine whether a given request may be indicative of a cyberattack.

In this example, if a confidence level of the determination by the agent module 124 is greater than a threshold value, the agent module 124 generates security event data indicative of a security event. The threshold value may be based on a security level, where an increased security level may detect greater amounts of security events than a lower security level. For example, the threshold value may be increased to reduce an amount of security events detected or the threshold value may be reduced to increase an amount of security events detected.

As a second example, an agent module 106 may be implemented separately from a provided service. For example, the security platform 102 may route some or all incoming requests to a service, such as service A 118, to the agent module 124. In this way, service A 118 may be implemented without any instrumentation. In this example, similar to the above first example, the agent module 124 may use one or more classifiers to determine whether a given request is indicative of a cyberattack. Further, in this second example, the agent module 124 may similarly implement a configurable threshold value based on a security level.

In some implementations, request data 118 may be indicative of a request directed to one or more services or assets. Request data 118 may be provided by a client compute resource 120 over a network, such as network 121. In this example, a service, such as service A 122, may receive one or more requests for services or to access an asset. The service A 122 may implement one or more compute resources 124. A compute resource 124 may comprise one or more of: a server, an access point, a virtual machine, a cloud compute resource, or some other compute resource that may perform operations that are associated with the services provided by the service A 122.

Continuing this example, the agent module 106 of the first stage may comprise one or more classifiers implemented using one or more techniques. For example, the one or more classifiers of the first stage may implement one or more of: thresholds, heuristics, statistical profiles, signature matching, static analysis, or a machine learning model. In this example, the agent module 106 may implement static analysis that may include determining whether a textual pattern in a request matches a signature associated with a cyberattack. Request data 118 may comprise one or more textual patterns.

The agent module 106 may determine a security event indicative of the request data 118 being associated with a cyberattack. If the agent module 106 determines that the request data 118 is indicative of a possible cyberattack, then the agent module 106 may generate security event data 126 indicative of a security event.

In some implementations, security event data 126 may be indicative of one or more of: the request data 118, an indication of a possible cyberattack, a description of the possible cyberattack, a description of the request data 118, response code, a time of the security event, one or more payloads associated with the request, one or more headers associated with the request, information indicative of the client compute resource 120, an IP address associated with the request data 118, among other types of information associated with a possible cyberattack.

In some implementations, in response to determining the security event, the agent module 106 may provide the security event data 126 to the second stage. If the agent module 106 determines that the request data 118 is not indicative of a possible cyberattack, the agent module 106 may proceed to determining whether another request is indicative of a cyberattack without providing the second stage with any indication of a security event. The second stage may comprise one or more classifiers that determine a cyberattack based on security event data determined at the first stage.

At the second stage, the security platform 102 may aggregate one or more security events based on periods of time associated with one or more classifiers. For example, the preprocessing module 110 may aggregate the one or more security events. The prediction module 112 may implement the one or more classifiers of the second stage. In one example, different aggregations of security event data over different periods of time may be associated with different classifiers of the second stage. An example classifier may be a trained machine learning model. An aggregation of security event data may comprise a set of security event data, a list of security event data, or metadata indicative of one or more instances of security event data.

In some implementations, the prediction module 112 may comprise N machine learning models, where each of the N machine learning models is associated with a respective period of time. In this example, the N machine learning models may comprise a first machine learning model associated with a 1-second period of time, a second machine learning model associated with a 30-second period of time, and so on until the Nth machine learning model associated with a Y-second period of time, where Y may be an arbitrary period of time. In other examples, the second stage may comprise more of fewer machine learning models that are associated with respective periods of time over which security events may be aggregated.

In this example, the preprocessing module 110 may provide different aggregations of security events to different machine learning models, where individual security events may be included within different aggregations. For example, over a 1-second period of time, a first aggregation may comprise A security events, over a 30-second period of time, a second aggregation may comprise B security events, where B comprises one or more of the A security events of the first aggregation. Similarly, larger aggregations may include one or more of the security events of one or more smaller aggregations.

In some implementations, a given aggregation of security data may be associated with metadata descriptive of the given aggregation of security data. For example, metadata may be indicative of one or more of: statistics based on one or more features of the security data, a rate of requests for requests associated with the security data, an indication of diversity of headers, an indication of a diversity of cookies, an indication of a diversity of paths, an indication of a diversity of webpages requested, a distribution of response codes, or content of one or more payloads.

The preprocessing module 110 may provide the one or more aggregations of security event data to one or more associated classifiers of the prediction module 112. For example, each respective period of time associated with a respective aggregation may be associated with a respective classifier. The preprocessing module 110 may periodically provide aggregations of security data to the prediction module 112, where the period of time may be a period of time associated with an aggregation.

For example, if a first aggregation is associated with a period of time of 1 second, then every 1 second, the preprocessing module 110 may provide the first aggregation to a classifier associated with a 1 second period of time. Similarly, for a given aggregation of security data over a given period of time, the given aggregation of security data may be provided as each given period of time lapses. In some examples, for a given aggregation of security data over a given period of time, the given aggregation of security data may be provided when the given aggregation of security data is determined.

In some implementations, the prediction module 112 may for a given aggregation of security event data, provide an associated classifier of the second stage to determine whether the given aggregation of security event data is indicative of a cyberattack. For example, there may be three different periods of time for which aggregations of security event data are determined, a 1-second aggregation, a 30-second aggregation, and a 5-minute aggregation.

In this example, there may be a respective classifier of the second stage associated with each respective aggregation of security event data. There may be three classifiers in the second stage, a first classifier of the second stage that is associated with 1-second aggregations, a second classifier of the second stage that is associated with 30-second aggregations, and a third classifier of the second stage that is associated with 5-minute aggregations.

Continuing this example, a respective classifier of the second stage, based on a respective aggregation of security event data, may determine a classification. If a given aggregation of security event data is classified as a cyberattack, then, based on the classification of a cyberattack, the real-time monitoring module 114 may initiate one or more remediation actions.

The one or more remediation actions by the monitoring module 112 may include generating an alert indicative of a cyberattack, where the alert may indicate metadata associated with a given aggregation. Metadata for a given aggregation is described above. Another remediation action that may be initiated is determination of security policy data 128 usable to detect similar types of cyberattacks. The security policy data 128 may comprise a security policy that describes one or more characteristics of the cyberattack.

The security policy data 128 may be provided to the agent module 106. Based on the security policy data 128, the agent module 106 may detect cyberattacks similar to the cyberattack associated with the security policy data 128. For example, the security policy data 128 may indicate a signature, or string, or other data that describes one or more characteristics of a request. As described above, characteristics of a request may include one or more of: an IP address, a payload, description of header information, a string of code, text, or some other request characteristic.

Figure 2:
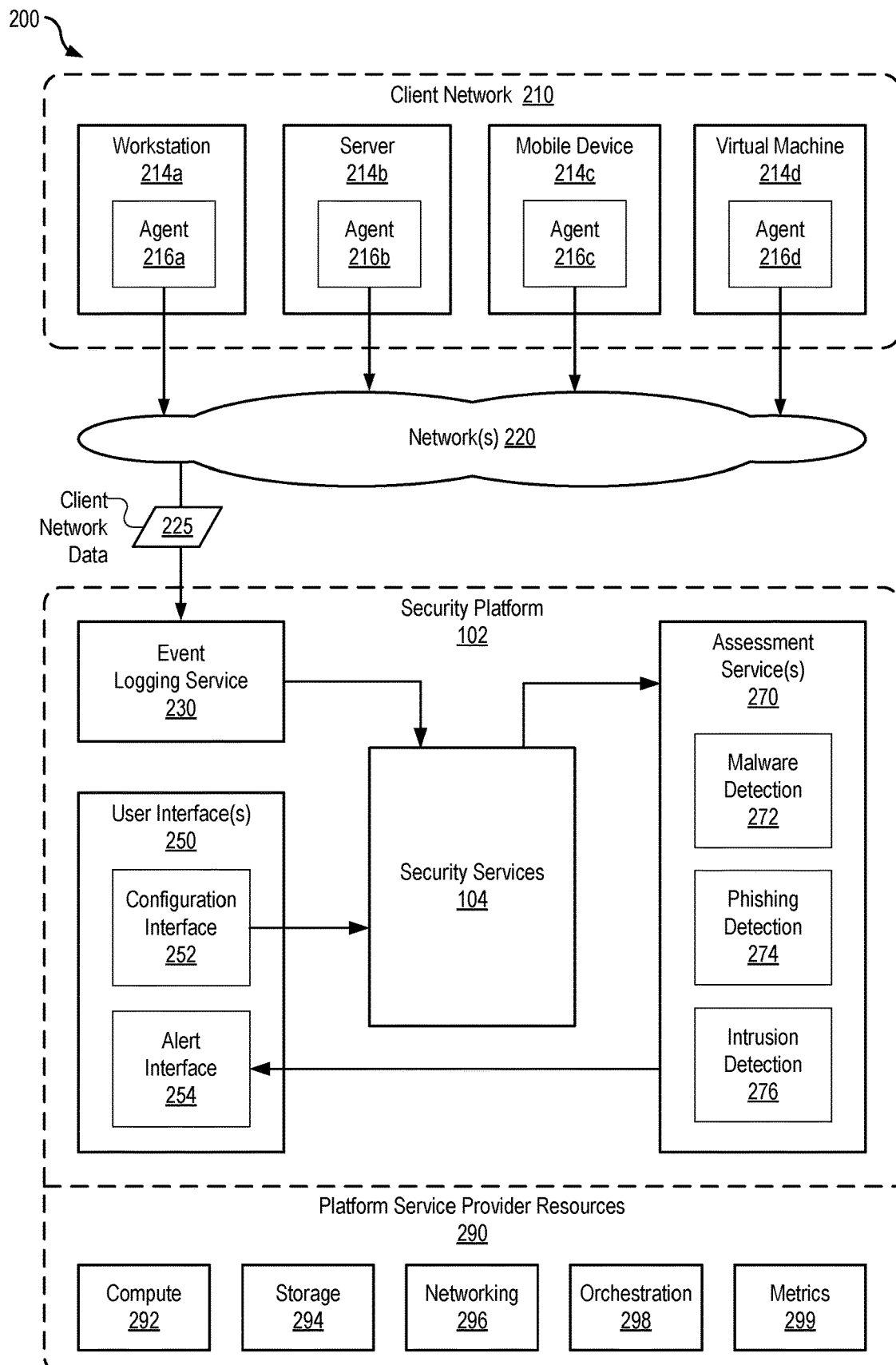
FIG. 2 is a block diagram illustrating example computing resources that implement a security platform, in accordance with some embodiments.

FIG. 2 is a block diagram illustrating example computing resources that implement a security platform, in accordance with some embodiments.

The security platform 102 may comprise one or more services implemented within a cloud computing environment and/or on a platform service provider network, such as a platform-as-a-service (PaaS) network, an infrastructure-as-a-service provider (IaaS) network, or a software-as-a-service (Saas) network. The security platform 102 may be configured to communicate with agents 216a-d deployed on computing resources in a client network 210.

In this example, the client network described with respect to FIG. 1 may be implemented by the client network 210, and the referenced computing resources may be implemented by computing resources 214a-214d. In this example, the computing resources 214a-214d are depicted as a workstation, a server, a mobile device, and a virtual machine. In other examples, a computing resource 214 may comprise personal computers, cloud compute instances, laptops, among other types of computing resources, or some other resource that may be vulnerable to a cyberattack. Computing resources are described in greater detail below.

In this example, agents 216 may communicate with the security platform 102 over one or more intermediary networks 220. In some embodiments, the agents 216 may be configured to collect or compile network activity data or network event data, and transmit the data, depicted as client network data 225, to the security platform 102. The security platform 102 may receive network activity data from many different client networks operated by different entities, companies, organizations, groups, etc., and perform remote monitoring of the networks of these different clients.

As shown, the client network 210 in this example includes different types of computing resources, such as a workstation 214a, a server 214b, a mobile device 214c, and a virtual machine 214d. The virtual machine 214d may be an instance of a computer and operating system that is emulated and hosted on a physical virtual machine host. The virtual machine host may implement virtualization hardware and/or software (e.g., a hypervisor) to execute and manage multiple instances of guest operating systems. Example implementations of such virtualization technologies include VMware ESX/ESXI, Microsoft Hyper-V, Amazon Web Services, and Microsoft Azure. Another type of virtualized execution environment may be a hosted container, which provides a portable and isolated execution environment over a host operating system of a physical host. Examples of container hosting technologies include Docker, Google Kubernetes, Amazon Web Services, and Microsoft Azure. In some embodiments, the virtual machine 214d may be hosted in a platform service provider network, such as the platform service provider network that is hosting the security platform 102. In some embodiments, the agents 216 may be deployed on other types of computing systems, including embedded systems, networking devices, storage devices, Internet-of-Things (IoT) devices, vehicles, and the like.

In various embodiments, the network 220 may encompass any suitable combination of networking hardware and protocols necessary to enable communications between the agents 216 and the security platform 102. In some embodiments, the remote machines 214 may execute in a private network of a company, behind a company firewall, and the network 220 may include a public network such as the Internet, which lies outside the firewall. The network 220 may encompass the different telecommunications networks and service providers that collectively implement the Internet.

In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, routing software, firewall/security software, etc.) for establishing networking links between the remote machines 214 and the security platform 102. In some embodiments, the agents 216 may transmit the client network data 225 to the security platform 102 over secure communication channels such as transport layer security (TLS) connections implemented over the network 220.

As shown in this example, the security platform 102 is implemented using a number of supporting services 230, 108, 250, and 270 implemented by the platform service provider network. Clients of the security platform 102 may convey service requests to and receive responses from these services via their respective service interfaces. In some embodiments, the service request and responses may be defined as part of a RESTful API (e.g., one or more web services). The requests and responses may be formatted as JSON documents. In some embodiments, the security platform 102 may implement service interfaces using other types of remote procedure calling protocols, such as Google Protocol Buffers. The platform service provider network may provide the hardware and/or software needed to implement service endpoints for these services, and the request routing facilities to ensure that a request is properly routed to the appropriate endpoints.

As shown, the platform service provider network may provide different types of computing resources, such as platform service provider resources 290, which can be used by customers to implement hosted services. As shown, the platform service provider may provide resource services such as compute resource service 292, storage resource service 294, networking resources service 296, orchestration service 298, and resource metrics service 299. The services of the security platform 102 may be built using these underlying resource services provided by the platform service provider.

In some embodiments, the platform service provider resources 290 may implement features such as load balancing of service requests and/or dynamic management and scaling of service node pools. In some embodiments, each of the services 230, 108, 250, and 270 may be implemented using a pool of service nodes provided by the platform service provider, which may be individual instances of virtual machines. In some embodiments, the platform service provider may be a provider such as Amazon Web Services or Microsoft Azure.

In some embodiments, the security platform 102 may be configured to monitor, analyze, and respond to security-related incidents that are detected in the remote client networks 210. For example, the client network data 225 may indicate request data 118, where the security platform 102 may determine a cyberattack as described with respect to FIG. 1.

In some embodiments, the security platform 102 may implement an event logging service 230 that receives client network data 225 from a client network 210 and stores the received data. The event logging service 230 may implement service functionality to allow users or other software components to query the event logs.

As shown, in some embodiments, the assessment service(s) 270 may implement a variety of monitoring processes to generate alerts in response to detected security problems in the client network 210. These alerts may be forwarded to an alert interface 254, which may allow human security analysts to perform a more in-depth examination of any underlying security problems. For example, in some embodiments, a malware detection module 272 may examine collected machine event logs to detect installation of a particular type of malware executable. As another example, a phishing detection module 274 may examine the email event logs to detect phishing attacks using new or unusual email addresses, web addresses, or email content. As yet another example, an intrusion detection module 276 may examine the network event logs to detect suspicious communication patterns or attacker packet signatures. In some embodiments, the alerts generated by the assessment service(s) 270 may trigger automated mitigation actions to be performed on the client network 210 to address detected threats in the client network.

In some embodiments, the security platform 102 may implement one or more user interface(s) 250, which may be implemented as GUIs or web interfaces viewable using a web browser. In some embodiments, these user interfaces 250 may be implemented by client-side applications. As shown, the user interfaces may include the alert interface 254 to notify users of detected alerts. In some embodiments, the alert interface 254 may be accessible from both the client network 210 and a central monitoring location where security analysts are monitoring the client network.

In some embodiments, the user interface(s) 250 may also implement a configuration interface 252. The configuration interface 252 may be used to configure various aspects of the security platform 102, including the security service 104. For example, the configuration interface 252 may be used to control various aspects of how the security service 104 operates, including initiating a scan, indicating one or more computing resources, and/or specifying a scanning schedule.

In some implementations, the security platform 102 may be implemented within a container system of a cloud computing environment or a container system of a data center. For example, a container system may be implemented by one or more container orchestration systems, including Kubernetes™, Docker Swarm™, among others. The container orchestration system may run on a cluster of nodes. In some examples, a given node may comprise a container runtime, where the given node may be implemented by one or more compute instances provided by a cloud services provider. In some examples, a given node among the cluster of nodes may comprise a container runtime, compute resources, memory, and one or more container instances.

In some implementations, the security platform 102 may comprise multiple services. For example, the security platform 102 may comprise services implemented by containerized applications operating on one or more nodes of a cluster. In this example, the security platform 102 may be implemented by a one or more containerized applications.

Figure 3:
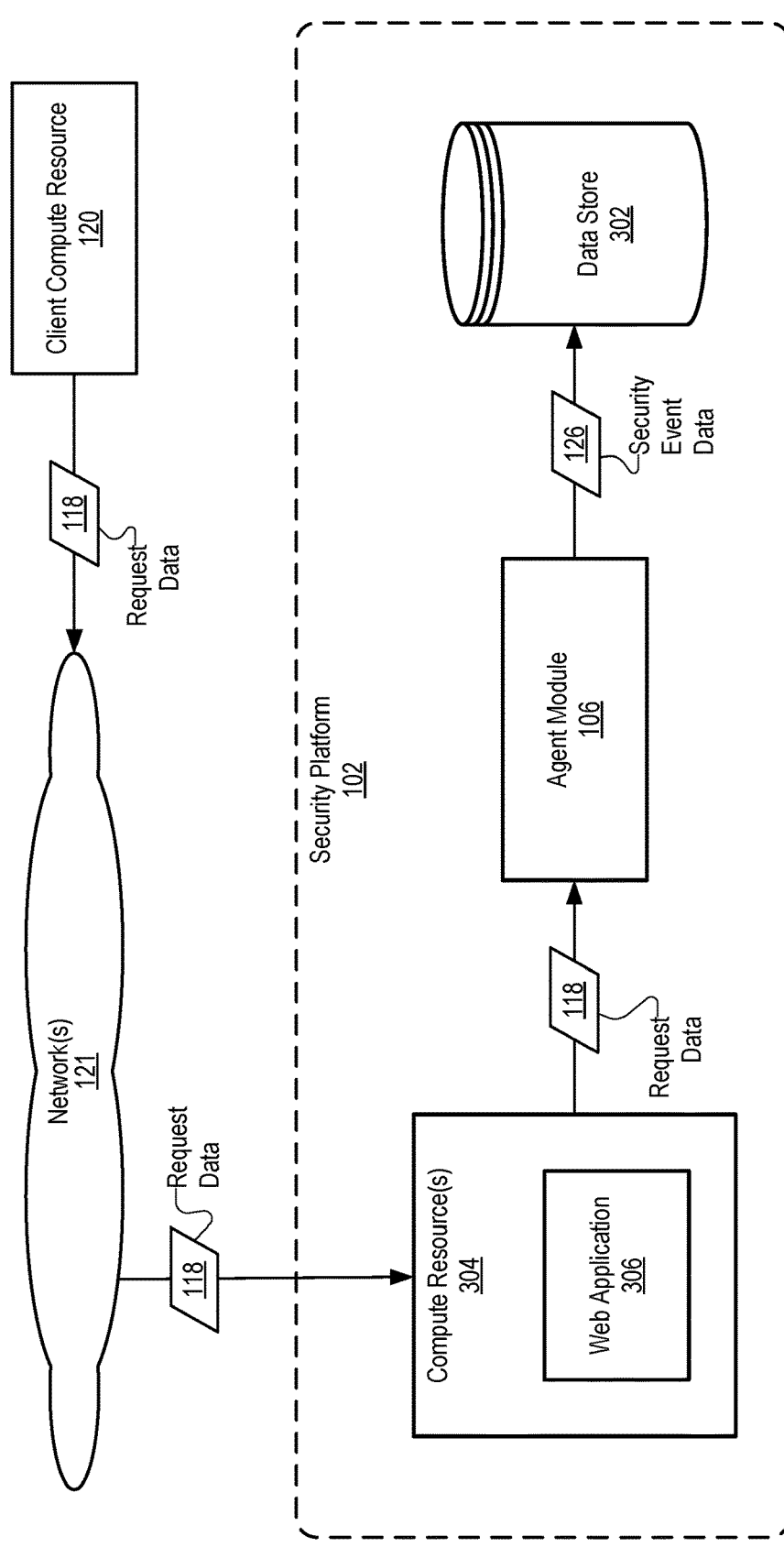
FIG. 3 is a block diagram 300 illustrating various components of a security platform performing data collection, in accordance with some embodiments.

FIG. 3 is a block diagram 300 illustrating various components of a security platform performing data collection, according to some embodiments.

In this example of data collection, the security platform 102 may determine security event data at a first stage that may be used to train one or more classifiers used by the second stage. The security event data may be determined by an agent module 106 and stored within a data store, such as data store 302.

While not depicted in this example, security event data determined at the first stage may, in addition to being stored for training classifiers, be provided to classifiers in the second stage to determine whether the security event data is indicative of a cyberattack.

In some implementations, compute resources 304 of the security platform 302 may receive request data 118. Compute resources 304 may include one or more servers, such as one or more web servers. Compute resources 304 may be implemented similarly to compute resources 124 described with respect to FIG. 1. The compute resources 304 may provide request data 118 to one or more agent modules 106. The compute resources 304 may also implement one or more web applications, such as web application 306. Web application 306 may provide services to the client compute resource 120.

In some implementations, the agent module 106 may determine, based on the request data 118, that the request data 118 is indicative of a security event, such as a cyberattack. The agent module 106 may be implemented as described with respect to FIG. 1. In this example, the agent module 106 may, based on determining that request data 118 is indicative of a cyberattack, determine security event data.

Determining security event data 126 may be carried out as described with respect to the security event data 126 described with respect to FIG. 1. While not depicted in this example, in other examples, where an agent module 106 is implemented independently from a service, the compute resources 304 may provide request data 118 to both the agent module 106 and to one or more services.

In some implementations, the security event data 126 may be stored for access by the preprocessing module 110. In this example, the data store 302 may be implemented by the security platform 302. In other examples, the data store 302 may be remote, and provided by one or more cloud services providers, such as Amazon S3, Google Cloud Platform, Microsoft Azure, among other storage services providers.

Figure 4:
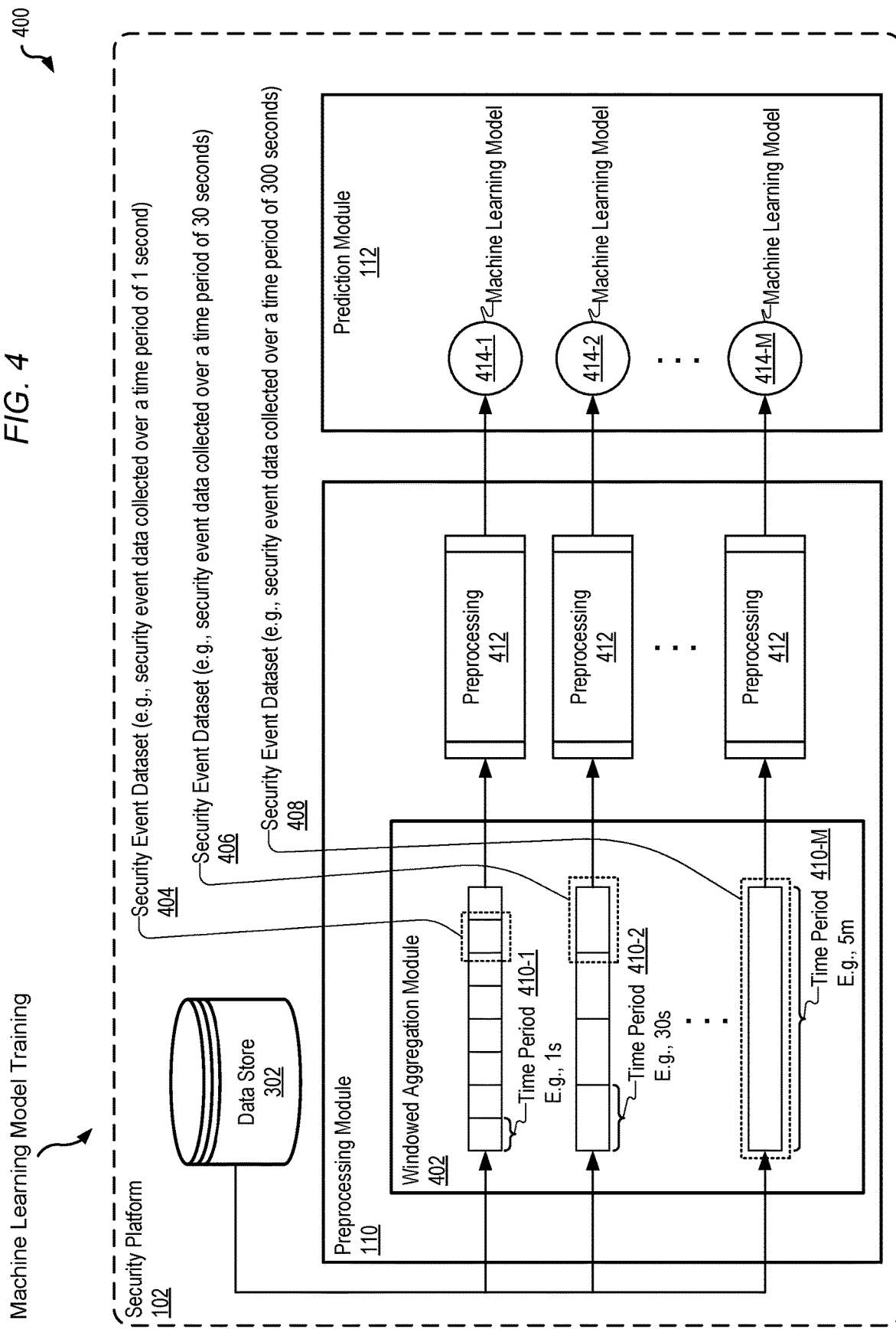
FIG. 4 is a block diagram 400 illustrating various components of a security platform used to train machine learning models, in accordance with some embodiments.

FIG. 4 is a block diagram 400 illustrating various components of a security platform used to train machine learning models, according to some embodiments.

In this example of machine learning model training, the security platform 102 may, based at least on security event data, determine training data used to training one or more classifiers. The one or more classifiers may be used in the second stage to determine whether security event data is indicative of a cyberattack. The security platform 102 may implement the preprocessing module 110 and the prediction module 112. The preprocessing module 110 may implement a windowed aggregation module 402.

In some implementations, the security platform 102 may access stored security event data. In this example, the security event data may be stored within a data store, such as data store 302. However, as described with respect to FIG. 3, the security event data may be stored using different techniques and in different locations.

Collection of security event data is described with respect to FIG. 3. Based on the security event data, the preprocessing module may aggregate the security event data into security event datasets 404 associated with varying periods of time. For example, different aggregations of security event data over different periods of time may be used to train machine learning models associated with a respective aggregation and respective period of time. An aggregation of security event data may comprise a set of security event data, a list of security event data, or metadata indicative of one or more instances of security event data.

In some implementations, the security event datasets 404-408 may be respective aggregations of security event data. The security event data may be indicative of security events detected over a particular period of time, such as 1 second, 5 seconds, 5 minutes, or some other period of time. Additional details on aggregations of security event data is described with respect to FIG. 1.

In this example, a same instance of security event data associated with a single security event may be provided to M queues. Each of the M queues may be associated with one or more respective security event datasets. In this example, the first queue may be associated with a first time period, time period 410-1, a second queue may be associated with a second time period, time period 410-2, and an Mth queue may be associated with an Mth time period, time period 410-M.

Continuing this example, with respect to the first queue and first time period, every time period, the security platform 102 may determine a security event dataset. For example, the first time period may begin at a first time, time X. In this example, X may be an arbitrary clock time, such as 21:00 UTC (Coordinated Universal Time). All security event data received between, or associated with timestamps between, time X and time X+1 second, may be included within a first security event dataset.

Similarly, with respect to the second queue and a second time period, all security event data received between, or with timestamps between, time X and time X+30 seconds, may be included within a second security event dataset. As additional security events are received, the security platform may include associated security event data into one or more queues associated with different time periods. As depicted, examples of security event datasets 404-408 are labeled for different queues of security event data.

In some embodiments, a given security event dataset may have associated metadata. In this example, the security event dataset and associated metadata may be used to train a classifier associated with a particular time period, where the particular time period may be associated with the given security event dataset. In some examples, preprocessing 412 may include transforming and normalizing security event data in a security event dataset, where transforming and normalizing may change raw feature vectors into a representation that is in accordance with training a machine learning model. As described herein, associated metadata may be determined by preprocessing 412.

As depicted, a first machine learning model 414-1 may be associated with the first time period 410-1, a second machine learning model 414-2 may be associated with the second time period 410-2, and so on until the Mth machine learning model 414-M, which may be associated with the Mth time period, time period 410-M. In some embodiments, a machine learning model may be trained using traditional techniques, such as a random forest algorithm, among many other machine learning techniques.

In some embodiments, the metadata may include one or more of: statistics based on one or more features of the security data, a rate of requests for requests associated with the security data, an indication of diversity of headers, an indication of a diversity of cookies, an indication of a diversity of paths, an indication of a diversity of webpages requested, a distribution of response codes, or content of one or more payloads.

Figure 5A:
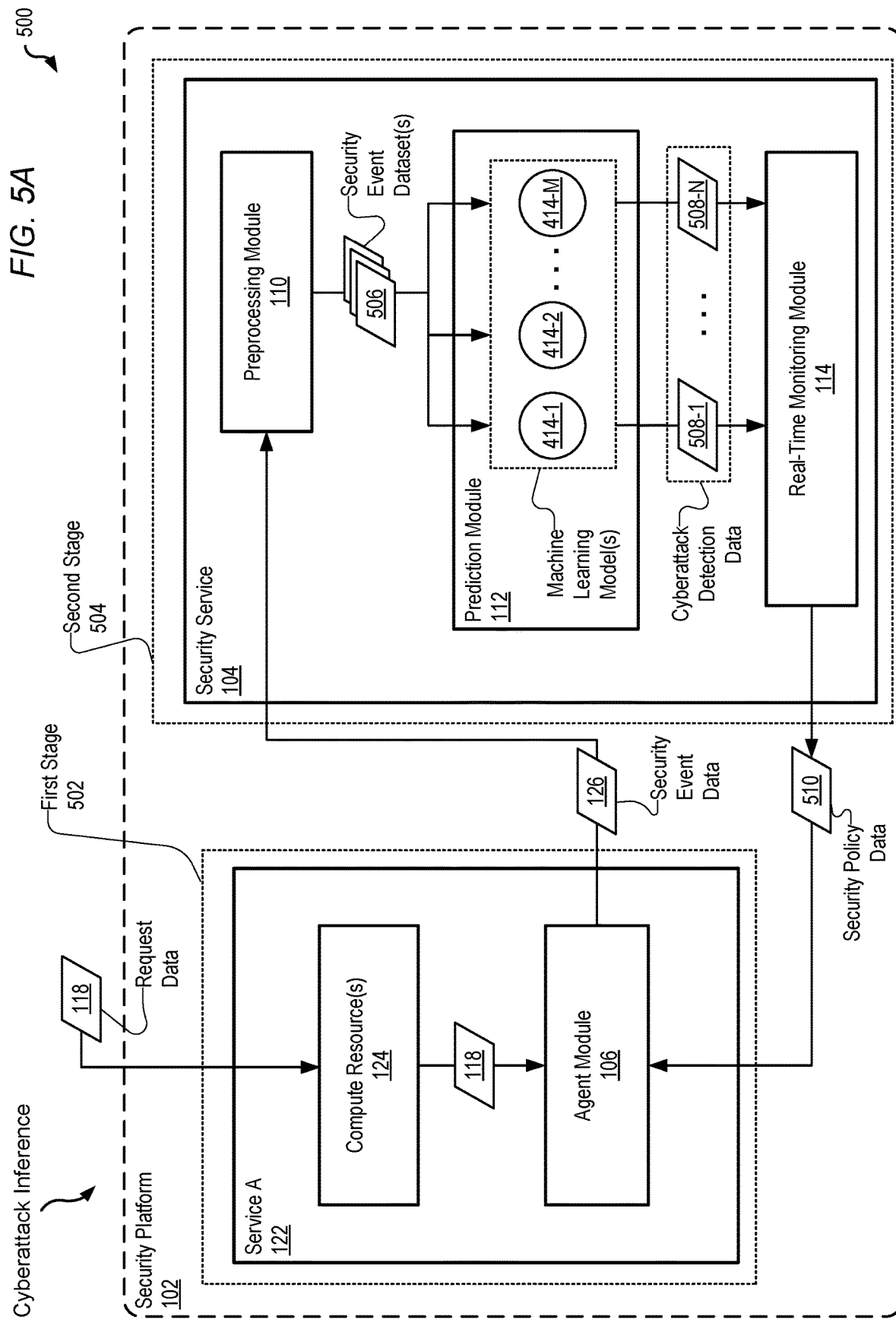
FIG. 5A is a block diagram 500 illustrating various components of a security platform using multiple stages of classifiers to determine a cyberattack, in accordance with some embodiments.

FIG. 5A is a block diagram 500 illustrating various components of a security platform using multiple stages of classifiers to determine a cyberattack, according to some embodiments.

Figure 5B:
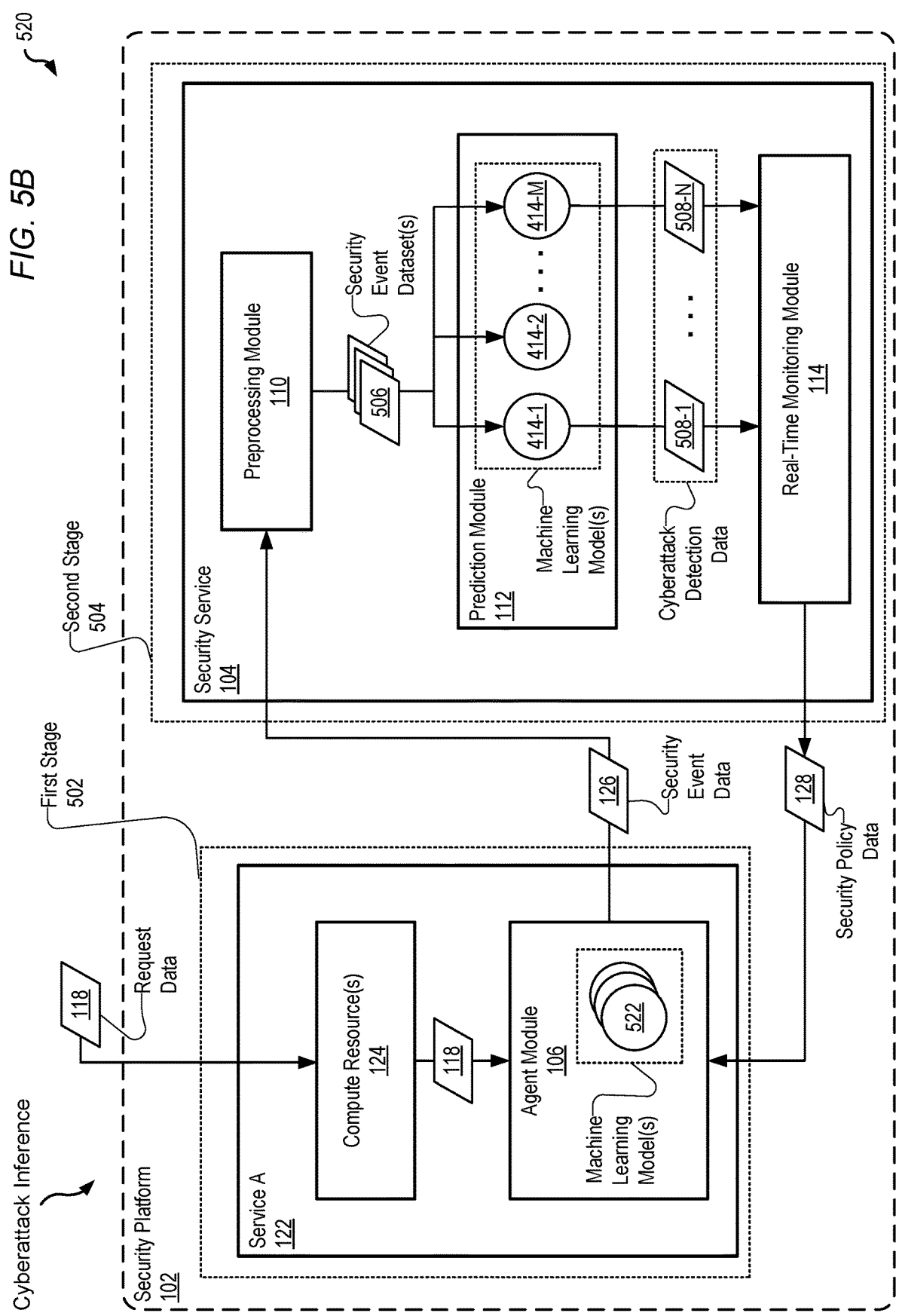
FIG. 5B is a block diagram 500 illustrating various components of a security platform using multiple stages of classifiers to determine a cyberattack, in accordance with some embodiments.
Figure 5C:
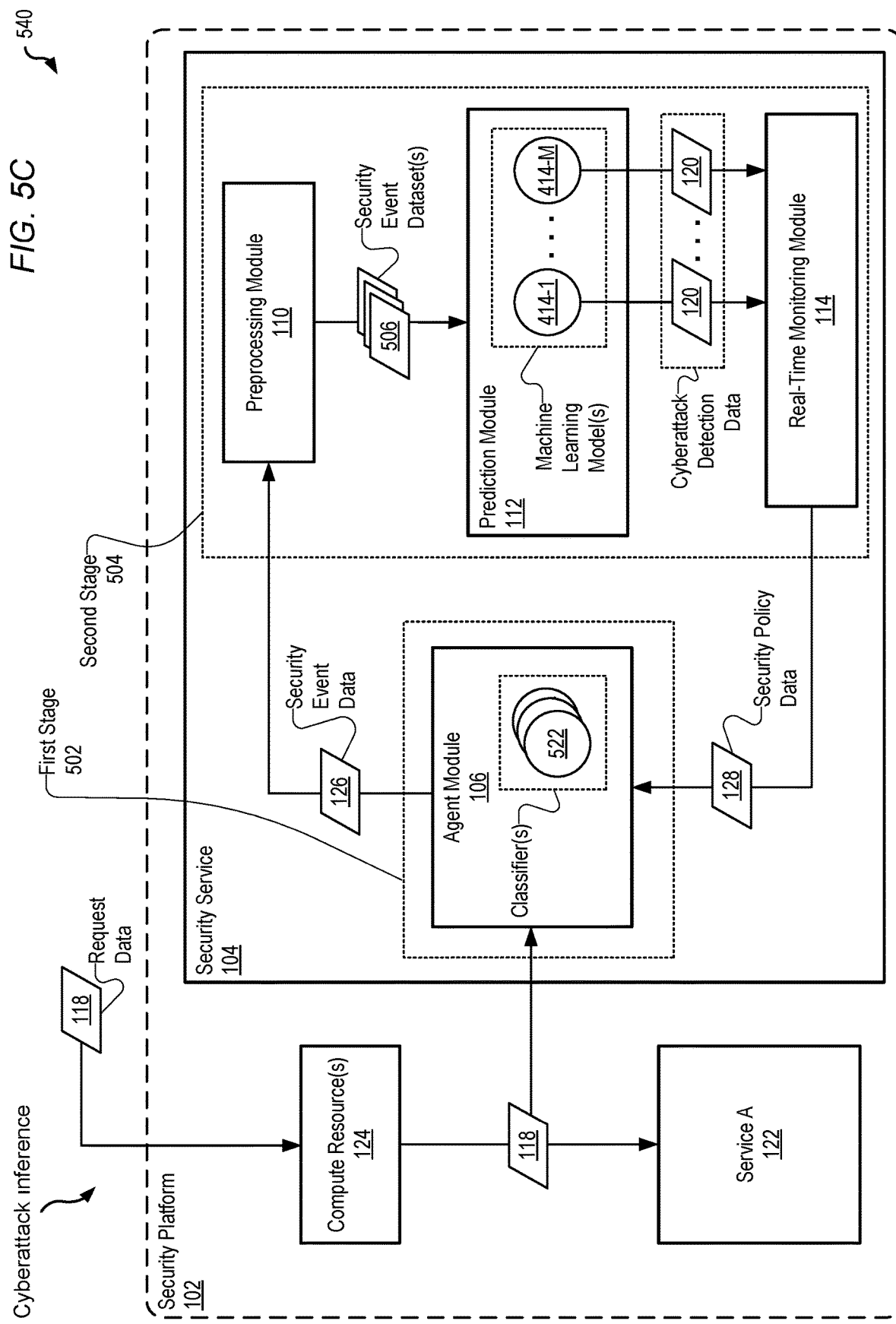
FIG. 5C is a block diagram 500 illustrating various components of a security platform using multiple stages of classifiers to determine a cyberattack, in accordance with some embodiments.

In this example, the security platform may detect a cyberattack based on using multiple stages of classifiers. The multiple stages may include a first stage 502 and a second stage 504. In this example, the first stage 502 may include an agent module 106 that is implemented as part of an instrumented service A 122. Further, in this example, the agent module 106 may implement one or more classifiers based on statistical analysis, thresholds, heuristics, signature matching, or textual analysis. In FIGS. 5B and 5C, additional implementations of a first stage and a second stage are described.

In some implementations, the first stage 502 may include one or more classifiers that determine whether request data 118 is indicative of a cyberattack. If the first stage 502 determines that request data 118 is indicative of a cyberattack, then the first stage 502 determines security event data 126. The first stage 502 is described in greater detail with respect to the first stage described in FIGS. 1-4.

In some implementations, the second stage 504 may include one or more classifiers that determine whether security event data 126 is indicative of a cyberattack. The second stage 504 may, based on security event datasets 506 and the one or more classifiers of the second stage 504, determine cyberattack detection data 508. A security event dataset 506 may be determined as described with respect to FIG. 4. The second stage 504 is described in greater detail with respect to the second stage described in FIGS. 1-4.

In some implementations, the real-time monitoring module 114 may, based on one or more instances of cyberattack detection data 508-1-508-N, generate an alert indicative of a cyberattack. The alert may be provided to an application monitoring interface. In some examples, the real-time monitoring module 114, may, based on one or more instances of cyberattack detection data 508-1-508-N, initiate one or more remediation operations based on a security policy. A security policy may specify one or more remediation operations based on one or more characteristics of a cyberattack indicated by cyberattack detection data 508.

A remediation operation may include restricting access, tracking operations associated with a cyberattack, alerting an administrator, among others. A remediation operation may also depend on a confidence level of a determination of a cyberattack, where more restrictive remediation operations are performed for cyberattack determinations with higher confidence levels than for cyberattack determines with lower confidence levels. Restricting access may include blocking an actor associated with a cyberattack indicated by cyberattack detection data 508 or blocking subsequent requests associated with a cyberattack indicated by cyberattack detection data 508.

FIG. 5B is a block diagram 520 illustrating various components of a security platform using multiple stages of classifiers to determine a cyberattack, according to some embodiments.

In this example, the security platform 102 may detect a cyberattack based on using multiple stages of classifiers. The multiple stages may include a first stage 502 and a second stage 504. In this example, the first stage 502 may include an agent module 106 that is implemented as part of an instrumented service A 122. The agent module 106, in contrast to the example described with respect to FIG. 5A, may implement one or more classifiers 522 that are machine learning models.

In some implementations, the one or more classifiers 522 of the first stage 502 may be trained using request data 118. For example, request data 118 may be collected and annotated to determine training data. The one or more classifiers 522 may be trained similarly to the description of training the one or more classifiers 414-1-414-M described with respect to FIG. 4.

In some implementations, operation of the first stage 502 and the second stage 504 of the security platform 102 with respect to determining a cyberattack may be performed similarly to the description of determining a cyberattack with respect to FIGS. 1-5A.

FIG. 5C is a block diagram 540 illustrating various components of a security platform using multiple stages of classifiers to determine a cyberattack, according to some embodiments.

In this example, the security platform 102 may detect a cyberattack based on using multiple stages of classifiers. The multiple stages may include a first stage 502 and a second stage 504. In this example, the first stage 502 and the second stage 504 may be implemented separately from one or more services, such as service A 122.

In this example, compute resources 124 may receive a request indicated by request data 118 and provide the request data 118 to a service A 122 and to the security service 104. In this example, the security service 104 may comprise the first stage 502 and the second stage 504.

In some implementations, operation of the first stage 502 and the second stage 504 of the security platform 102 with respect to determining a cyberattack may be performed similarly to the description of determining a cyberattack with respect to FIGS. 1-5B.

Figure 6:
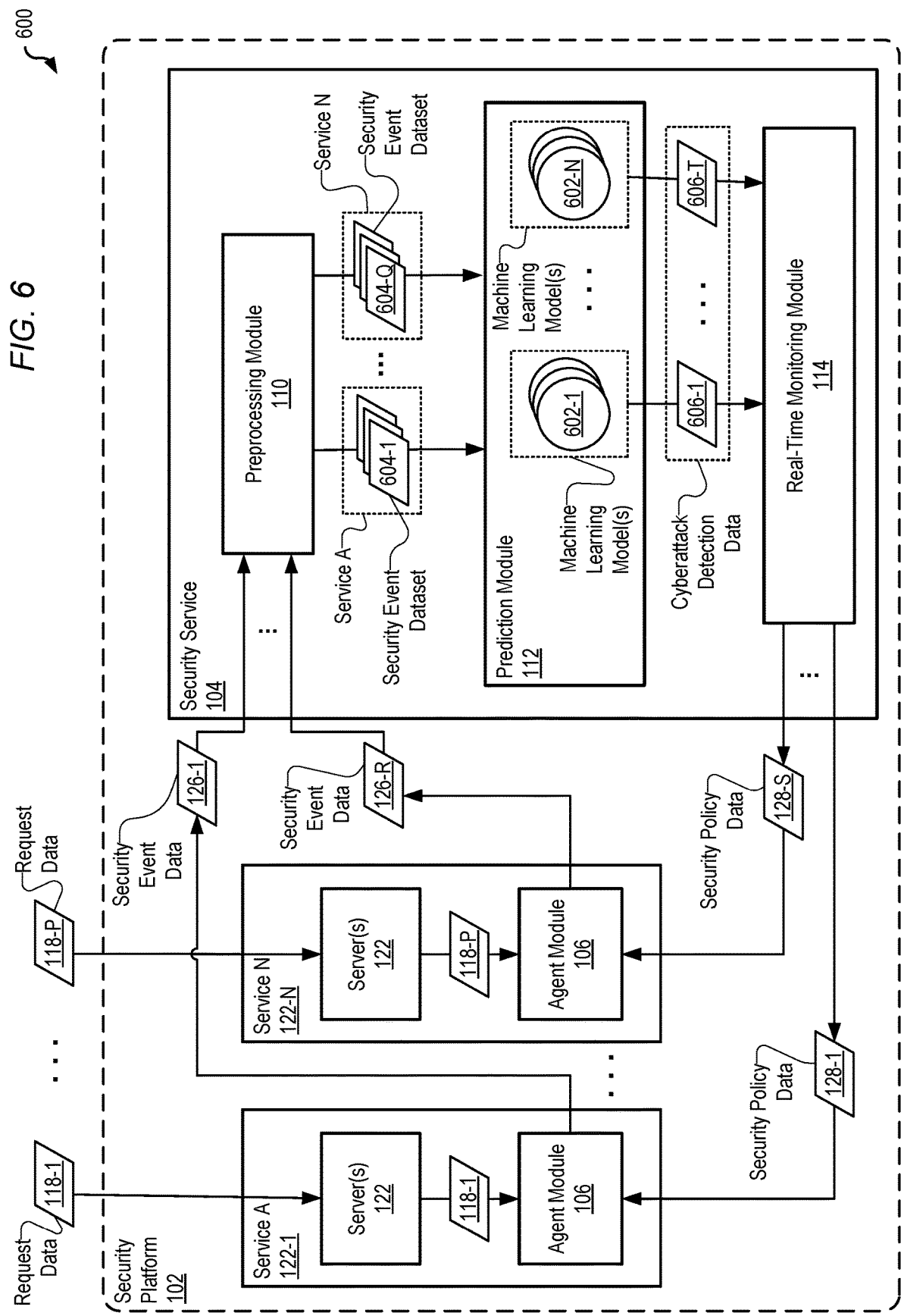
FIG. 6 is a block diagram 600 illustrating various components of a security platform using multiple stages of classifiers to determine a cyberattack, in accordance with some embodiments.

FIG. 6 is a block diagram 600 illustrating various components of a security platform using multiple stages of classifiers to determine a cyberattack, according to some embodiments.

In this example, the security platform 102 may detect a cyberattack based on using multiple stages of classifiers. The multiple stages may include a first stage 502 and a second stage 504. In this example, the first stage 502 and the second stage 504 may be implemented separately from one or more services, such as service A 122-1 through service N 122-N.

In contrast to the examples described with respect to the FIGS. 5A-5C, in this example, the security platform 102 may implement multiple sets of classifiers. For example, the prediction module 112 may comprise N sets of classifiers, 602-1-602-N, where a respective set of classifiers 602 may be associated with a respective service 122. In some examples, the prediction 112 may comprise N sets of classifiers, 602-1-602-N, where a respective set of classifiers 602 may be associated with a respective type of service 122.

In this example, a first set of machine learning models 602-1 may be associated with a first service, service A 122-1. The first stage 502 may determine one or more instances of security event data 526-1. The second stage 504 may, based on the one or more instances of security event data 526-1, determine a security event dataset 604-1. The security event dataset 604-1 may be used by the prediction module 112 as a basis to determine a cyberattack indicated by cyberattack detection data 606-1. The real-time monitoring module 114 may, based on cyberattack detection data 606-1, determine security policy data 128-1.

Similarly, the determination of security event data 126-1-126-R, security event datasets 604-1-604-Q, machine learning models 602-1-602-N, cyberattack detection data 606-1-606-T, and security policy data 128-1-128-S may be performed as described with respect to FIGS. 1-5C.

FIG. 7 is a flowchart 700 that illustrates an example of the security platform using multiple stages of classifiers to determine a cyberattack. In FIG. 7, one or more hardware processors may be used to implement the example process, where the hardware processors are described with respect to FIGS. 2 and 9.

FIG. 7 illustrates an example process that includes: determining, at 710, based on at least one classifier associated with a compute resource, a first stage of classifiers that receive requests directed to the compute resource; determining, at 720, based on a plurality of periods of time, a plurality of security event datasets, where the plurality of security event datasets indicative of cyberattacks detected by the first stage of classifiers; determining, at 730, based on the plurality of security event datasets, a plurality of training datasets; determining, at 740, based on the plurality of training datasets, a plurality of classifiers; and determining, at 750, based on the plurality of classifiers, a second stage of classifiers that operate on respective security event datasets.

Determining, at 710, based on at least one classifier associated with a compute resource, a first stage of classifiers that receive requests directed to the compute resource may be carried out as described with respect to FIGS. 1-6. For example, a compute resource may be a service, such as service A 122, the first stage of classifiers may be first stage 502, where the first stage of classifiers may receive requests indicated by request data 118.

Determining, at 720, based on a plurality of periods of time, a plurality of security event datasets, where the plurality of security event datasets indicative of cyberattacks detected by the first stage of classifiers may be carried out as described with respect FIGS. 1-6. For example, as described with respect to FIG. 4, the security platform 102 may, using preprocessing module 110, determine a plurality of security event datasets 404-408.

Determining, at 730, based on the plurality of security event datasets, a plurality of training datasets may be carried out as described with respect to FIGS. 1-6. For example, the security platform 102 may, using preprocessing module 110, determine a plurality of training datasets.

Determining, at 740, based on the plurality of training datasets, a plurality of classifiers may be carried out as described with respect to FIGS. 1-6. For example, the security platform 102 may automatically train the plurality of machine learning models 414-1-414-M. The plurality of classifiers may be implemented by the plurality of machine learning models 414-1-414-M. The plurality of machine learning models 414-1-414-M may be automatically trained by the security platform 102 by using traditional techniques, such as Amazon SageMaker, among other machine learning training tools generally available.

Determining, at 750, based on the plurality of classifiers, a second stage of classifiers that operate on respective security event datasets may be carried out as described with respect to FIGS. 1-6. For example, the second stage of classifiers may be implemented by second stage 504, as described with respect to FIGS. 1-6.

FIG. 8 is a flowchart 800 that illustrates an example of the security platform using multiple stages of classifiers to determine a cyberattack. In FIG. 8, one or more hardware processors may be used to implement the example process, where the hardware processors are described with respect to FIGS. 2 and 9.

FIG. 8 illustrates an example process that includes: determining, at 810, one or more access attempts of a compute resource, where a first stage classifier is associated with the compute resource; determining, at 820, based on the first stage classifier operating on the one or more access attempts, a plurality of security event datasets indicative of one or more cyberattacks associated with a plurality of periods of time; determining, at 830, from among a plurality of second stage classifiers, a second stage classifier associated with a first period of time among the plurality of periods of time;

and determining, at 840, based on the second stage classifier operating on a security event dataset associated with the first period of time, a cyberattack on the compute resource, where the security event dataset is among the plurality of security event datasets.

Determining, at 810, one or more access attempts of a compute resource, where a first stage classifier is associated with the compute resource may be carried out as described with respect to FIGS. 1-6. For example, the one or more access attempts may be one or more requests for access to service A 122, where the compute resource may be service A 122. The one or more requests may be indicated by request data 118.

Determining, at 820, based on the first stage classifier operating on the one or more access attempts, a plurality of security event datasets indicative of one or more cyberattacks associated with a plurality of periods of time may be carried out as described with respect to FIGS. 1-6. For example, the agent module 106 may implement a first stage classifier, the preprocessing module 110 may determine the plurality of security event datasets 404-408, and the one or more cyberattacks may be indicated by security event data 126.

Determining, at 830, from among a plurality of second stage classifiers, a second stage classifier associated with a first period of time among the plurality of periods of time may be carried out as described with respect to FIGS. 1-6. For example, as described with respect to FIG. 4, the second stage classifiers 414 may include individual classifiers associated with respective periods of time.

Determining, at 840, based on the second stage classifier operating on a security event dataset associated with the first period of time, a cyberattack on the compute resource, where the security event dataset is among the plurality of security event datasets may be carried out as described with respect to FIGS. 1-6. For example, the second stage classifiers 414 may determine cyberattack detection data indicative of a cyberattack on the security service A 122.

Figure 9:
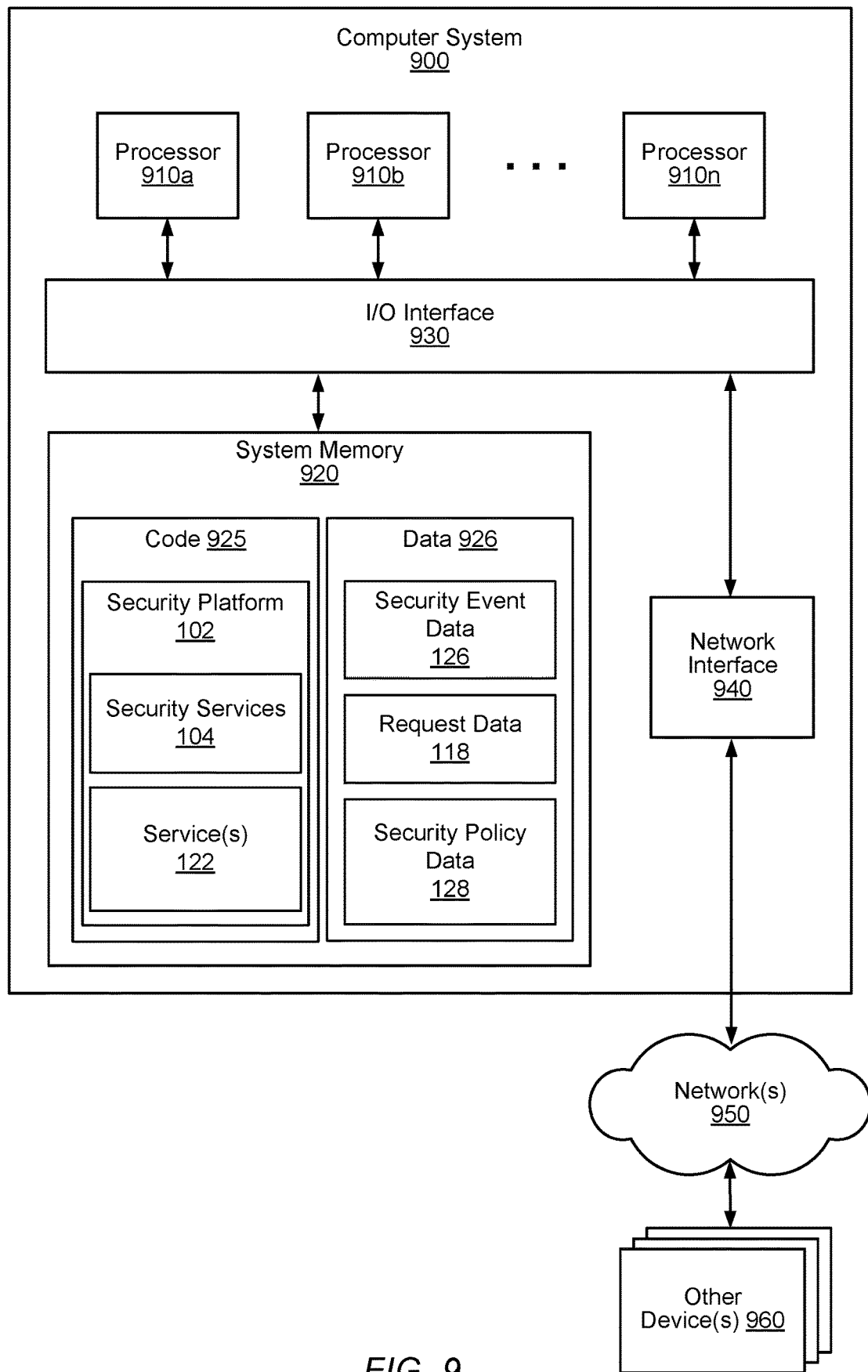
FIG. 9 is a block diagram illustrating an example computer system that may be used to implement one or more portions of a security platform using multiple stages of classifiers to determine a cyberattack, according to some embodiments.

FIG. 9 is a block diagram illustrating an example computer system 900 that is used to implement one or more portions of a system that implements a security platform 102, according to some embodiments. For example, the computer system 900 may be a server that implements one or more components of the security platform 102 of FIGS. 1-5.

Computer system 900 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 900 includes one or more processors 910, which may include multiple cores coupled to a system memory 920 via an input/output (I/O) interface 930. Computer system 900 further includes a network interface 940 coupled to I/O interface 930. In some embodiments, computer system 900 may be a uniprocessor system including one processor 910, or a multiprocessor system including several processors 910*a-n*, as shown. The processors 910 may be any suitable processors capable of executing instructions. For example, in various embodiments, processors 910 may implement one of a number of instruction set architectures (ISAs), such as the x86, PowerPC, SPARC, or MIPS ISA.

As shown, the computer system 900 may also include one or more network communication devices (e.g., network interface 940) for communicating with other systems and/or components over a communications network. For example, an instance of an application executing on computer system 900 may use network interface 940 to communicate with another server application executing on another computer system, as described herein.

As shown, computer system 900 may use its network interface 940 to communicate with one or more other devices 960, such as persistent storage devices and/or one or more I/O devices. In some embodiments, some of these other devices may be implemented locally on the computer system 900, accessible via the I/O interface 930. In various embodiments, persistent storage devices may include disk drives, tape drives, solid state memory, other mass storage devices, or any other persistent storage device. The computer system 900 may store instructions and/or data in persistent storage devices and retrieve the stored instruction and/or data as needed.

As shown, the computer system 900 may include one or more system memories 920 that store instructions and data accessible by processor(s) 910. In various embodiments, system memories 920 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 920 may be used to store code 925 or executable instructions to implement the methods and techniques described herein. For example, the executable instructions may include instructions to implement a network scanner (including associated sub-components: a network latency component; a dynamic RTT timeout value; RTT parameters; and a statistics components). The system memory 920 may also be used to store data 926 needed or produced by the executable instructions. For example, the in-memory data 926 may include security event data 126, security policy data 128, and request data 118, as discussed with respect to FIG. 1.

In some embodiments, some of the code 925 or executable instructions may be persistently stored on the computer system 900 and may have been loaded from external storage media. The persistent storage of the computer system 900 and the external media are examples of non-transitory computer-readable storage media, which may be used to store program instructions to be executed by the computer system 900. A non-transitory computer-readable storage medium may provide the capability to store information in a form readable by a machine (e.g., computer system 900). Non-transitory computer-readable media may include storage media such as magnetic or optical media, disk or DVD/CD-ROM devices, archival tapes, network-attached storage systems, or other computer systems.

In some embodiments, the I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

In some embodiments, the network interface 940 may allow data to be exchanged between computer system 900 and other devices attached to a network. The network interface 940 may also allow communication between computer system 900 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). In some embodiments, the network interface 940 may support communication via telecommunications/telephony networks such as analog voice networks or digital fiber communications networks, via storage area networks such as Fibre Channel SANs, or via any other suitable type of network and/or protocol.

In some implementations, advantages and features of the present disclosure may be further described by the following 20 statements.

1. A method comprising: determining, based on at least one classifier associated with a compute resource, a first stage of classifiers that receive requests directed to the compute resource; determining, based on a plurality of periods of time, a plurality of security event datasets indicative of cyberattacks detected by the first stage of classifiers; determining, based on the plurality of security event datasets, a plurality of training datasets; determining, based on the plurality of training datasets, a plurality of classifiers; and determining, based on the plurality of classifiers, a second stage of classifiers that operate on respective security event datasets.
2. The method of any of the preceding statements, wherein the first stage of classifiers are instrumented within application code of a service being monitored for cyberattacks.
3. The method of any of the preceding statements, wherein each security event dataset of the plurality of security event datasets is associated with the respective period of time.
4. The method of any of the preceding statements, wherein the first stage of classifiers determines a cyberattack based on a single request from a client compute resource.
5. The method of any of the preceding statements, wherein each respective classifier of the second stage of classifiers determines a cyberattack based on a respective security event dataset.
6. The method of any of the preceding statements, wherein the first stage of classifiers determines a cyberattack based on one or more of: statistical analysis, textual analysis, or signature matching.
7. The method of any of the preceding statements, wherein the second stage of classifiers comprises a plurality of machine learning models trained on security event datasets associated with a plurality of periods of time.
8. A system comprising: a memory storing executable instructions; and one or more processors that execute the executable instructions to: determine, based on at least one classifier associated with a compute resource, a first stage of classifiers that receive requests directed to the compute resource; determine, based on a plurality of periods of time, a plurality of security event datasets indicative of cyberattacks detected by the first stage of classifiers; determine, based on the plurality of security event datasets, a plurality of training datasets; determine, based on the plurality of training datasets, a plurality of classifiers; and determine, based on the plurality of classifiers, a second stage of classifiers that operate on respective security event datasets.
9. The system of any of the preceding statements, wherein the first stage of classifiers are instrumented within application code of a service being monitored for cyberattacks.
10. The system of any of the preceding statements, wherein each security event dataset of the plurality of security event datasets is associated with the respective period of time.
11. The system of any of the preceding statements, wherein the first stage of classifiers determines a cyberattack based on a single request from a client compute resource.
12. The system of any of the preceding statements, wherein each respective classifier of the second stage of classifiers determines a cyberattack based on a respective security event dataset.
13. The system of any of the preceding statements, wherein the first stage of classifiers determines a cyberattack based on one or more of: statistical analysis, textual analysis, or signature matching.
14. The system of any of the preceding statements, wherein the second stage of classifiers comprises a plurality of machine learning models trained on security event datasets associated with a plurality of periods of time.
15. One or more non-transitory computer-accessible storage media storing executable instructions that, when executed by one or more processors, cause a computer system to: determine, based on at least one classifier associated with a compute resource, a first stage of classifiers that receive requests directed to the compute resource; determine, based on a plurality of periods of time, a plurality of security event datasets indicative of cyberattacks detected by the first stage of classifiers; determine, based on the plurality of security event datasets, a plurality of training datasets; determine, based on the plurality of training datasets, a plurality of classifiers; and determine, based on the plurality of classifiers, a second stage of classifiers that operate on respective security event datasets.
16. The non-transitory computer-accessible storage media of any of the preceding statements, wherein the first stage of classifiers are instrumented within application code of a service being monitored for cyberattacks.
17. The non-transitory computer-accessible storage media of any of the preceding statements, wherein each security event dataset of the plurality of security event datasets is associated with the respective period of time.
18. The non-transitory computer-accessible storage media of any of the preceding statements, wherein the first stage of classifiers determines a cyberattack based on a single request from a client compute resource.
19. The non-transitory computer-accessible storage media of any of the preceding statements, wherein each respective classifier of the second stage of classifiers determines a cyberattack based on a respective security event dataset.
20. The non-transitory computer-accessible storage media of any of the preceding statements, wherein the second stage of classifiers comprises a plurality of machine learning models trained on security event datasets associated with a plurality of periods of time.

In some implementations, additional advantages and features of the present disclosure may be further described by the following 20 statements.

1. A method comprising: determining one or more access attempts of a compute resource, wherein a first stage classifier is associated with the compute resource; determining, based on the first stage classifier operating on the one or more access attempts, a plurality of security event datasets indicative of one or more cyberattacks associated with a plurality of periods of time; determining, from among a plurality of second stage classifiers, a second stage classifier associated with a first period of time; and determining, based on the second stage classifier operating on a security event dataset associated with the first period of time, a cyberattack on the compute resource, wherein the security event dataset is among the plurality of security event datasets.
2. The method of any of the preceding statements, further comprising: determining, based on one or more characteristics of the cyberattack, security policy data.
3. The method of any of the preceding statements, further comprising: providing the security policy data to the first stage classifier; and determining, by the first stage classifier using the security policy data, a subsequent cyberattack.
4. The method of any of the preceding statements, wherein the plurality of security event datasets includes security event data indicative of one or more cyberattacks detected by the first stage classifier.
5. The method of any of the preceding statements, wherein the first stage classifier is instrumented within a service that receives the one or more access attempts.
6. The method of any of the preceding statements, wherein the first stage classifier determines a cyberattack based on one or more of: statistical analysis, textual analysis, or signature matching.
7. The method of any of the preceding statements, wherein the plurality of second stage classifiers comprises a plurality of machine learning models trained on security event datasets associated with a plurality of periods of time.
8. A system comprising: a memory storing executable instructions; and one or more processors that execute the executable instructions to: determine one or more access attempts of a compute resource, wherein a first stage classifier is associated with the compute resource; determine, based on the first stage classifier operating on the one or more access attempts, a plurality of security event datasets indicative of one or more cyberattacks associated with a plurality of periods of time; determine, from among a plurality of second stage classifiers, a second stage classifier associated with the first period of time; and determine, based on the second stage classifier operating on a security event dataset associated with a first period of time, a cyberattack on the compute resource, wherein the security event dataset is among the plurality of security event datasets.
9. The system of any of the preceding statements, wherein the one or more processors further execute the executable instructions to: determine, based on one or more characteristics of the cyberattack, security policy data.
10. The system of any of the preceding statements, wherein the one or more processors further execute the executable instructions to: provide the security policy data to the first stage classifier; and determine, by the first stage classifier using the security policy data, a subsequent cyberattack.
11. The system of any of the preceding statements, wherein the plurality of security event datasets includes security event data indicative of one or more cyberattacks detected by the first stage classifier.
12. The system of any of the preceding statements, wherein the first stage classifier is instrumented within a service that receives the one or more access attempts.
13. The system of any of the preceding statements, wherein the first stage classifier determines a cyberattack based on one or more of: statistical analysis, textual analysis, or signature matching.
14. The system of any of the preceding statements, wherein the plurality of second stage classifiers comprises a plurality of machine learning models trained on security event datasets associated with a plurality of periods of time.
15. One or more non-transitory computer-accessible storage media storing executable instructions that, when executed by one or more processors, cause a computer system to: determine one or more access attempts of a compute resource, wherein a first stage classifier is associated with the compute resource; determine, based on the first stage classifier operating on the one or more access attempts, a plurality of security event datasets indicative of one or more cyberattacks associated with a plurality of periods of time; determine, from among a plurality of second stage classifiers, a second stage classifier associated with a first period of time; and determine, based on the second stage classifier operating on a security event dataset associated with the first period of time, a cyberattack on the compute resource, wherein the security event dataset is among the plurality of security event datasets.
16. The non-transitory computer-accessible storage media of any of the preceding statements, wherein the one or more processors further execute the executable instructions to: determine, based on one or more characteristics of the cyberattack, security policy data.
17. The non-transitory computer-accessible storage media of any of the preceding statements, wherein the one or more processors further execute the executable instructions to: provide the security policy data to the first stage classifier; and determine, by the first stage classifier using the security policy data, a subsequent cyberattack.
18. The non-transitory computer-accessible storage media of any of the preceding statements, wherein the plurality of security event datasets includes security event data indicative of one or more cyberattacks detected by the first stage classifier.

19. The non-transitory computer-accessible storage media of any of the preceding statements, wherein the first stage classifier is instrumented within a service that receives the one or more access attempts.

20. The non-transitory computer-accessible storage media of any of the preceding statements, wherein the plurality of second stage classifiers comprises a plurality of machine learning models trained on security event datasets associated with a plurality of periods of time.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A method comprising:
    determining one or more access attempts of a compute resource, wherein a first stage classifier is associated with the compute resource;
    determining, based on the first stage classifier operating on the one or more access attempts, a security event indicative of a possible cyberattack on the compute resource, wherein the first stage classifier generates security events that indicates possible cyberattacks based on one or more of statistical analysis, textual analysis, or signature matching applied to individual access attempts;
    in response to the determination of the possible cyberattack by the first stage classifier:
        determining, from among a plurality of second stage classifiers, a second stage classifier associated with a first period of time, wherein
            the plurality of second stage classifiers comprise a classifier that operates on event data periods of five seconds or less and another classifier that operates on event periods of more than five seconds;
        aggregating multiple security events in the first period of time into a security event dataset, wherein the security event is in the first period of time;
        determining, based on the second stage classifier operating on the security event dataset associated with the first period of time, a cyberattack on the compute resource; and
        blocking the cyberattack or one or more subsequent access attempts associated with the cyberattack based on the determination of the cyberattack by the second stage classifier.

2. The method of claim 1, further comprising:
    determining, based on one or more characteristics of the cyberattack, security policy data.

3. The method of claim 2, further comprising:
    providing the security policy data to the first stage classifier; and
    determining, by the first stage classifier using the security policy data, a subsequent cyberattack.

4. The method of claim 1, wherein the first stage classifier is instrumented within a service that receives the one or more access attempts.

5. The method of claim 1, wherein the first stage classifier has higher execution performance than the second stage classifier but a higher false positive rate than the second stage classifier.

6. The method of claim 1, wherein the plurality of second stage classifiers comprises a plurality of machine learning models trained on security event datasets associated with a plurality of periods of time.

7. A system comprising:
    a memory storing executable instructions; and
    one or more processors that execute the executable instructions to:
        determine one or more access attempts of a compute resource, wherein a first stage classifier is associated with the compute resource;
        determine, based on the first stage classifier operating on the one or more access attempts, a security event indicative of a possible cyberattack on the compute resource, wherein the first stage classifier generates security events that indicates possible cyberattacks based on one or more of statistical analysis, textual analysis, or signature matching applied to individual access attempts;
    in response to the determination of the possible cyberattack by the first stage classifier:
        determine, from among a plurality of second stage classifiers, a second stage classifier associated with a first period of time, wherein
            the plurality of second stage classifiers comprise a classifier that operates on event data periods of five seconds or less and another classifier that operates on event periods of more than five seconds;
        aggregate multiple security events in the first period of time into a security event dataset, wherein the security event is in the first period of time;
        determine, based on the second stage classifier operating on the security event dataset associated with the first period of time, a cyberattack on the compute resource; and
        block the cyberattack or one or more subsequent access attempts associated with the cyberattack based on the determination of the cyberattack by the second stage classifier.

8. The system of claim 7, wherein the one or more processors further execute the executable instructions to:
    determine, based on one or more characteristics of the cyberattack, security policy data.

9. The system of claim 8, wherein the one or more processors further execute the executable instructions to:
    provide the security policy data to the first stage classifier; and
    determine, by the first stage classifier using the security policy data, a subsequent cyberattack.

10. The system of claim 7, wherein the first stage classifier is instrumented within a service that receives the one or more access attempts.

11. The system of claim 7, wherein the first stage classifier has higher execution performance than the second stage classifier but a higher false positive rate than the second stage classifier.

12. The system of claim 7, wherein the plurality of second stage classifiers comprises a plurality of machine learning models trained on security event datasets associated with a plurality of periods of time.

13. One or more non-transitory computer-accessible storage media storing executable instructions that, when executed by one or more processors, cause a computer system to:
- determine one or more access attempts of a compute resource, wherein a first stage classifier is associated with the compute resource;
- determine, based on the first stage classifier operating on the one or more access attempts, a security event indicative of a possible cyberattack on the compute resource, wherein the first stage classifier generates security events that indicates possible cyberattacks based on one or more of statistical analysis, textual analysis, or signature matching applied to individual access attempts;
- in response to the determination of the possible cyberattack by the first stage classifier:
  - determine, from among a plurality of second stage classifiers, a second stage classifier associated with a first period of time, wherein
    - the plurality of second stage classifiers comprise a classifier that operates on event data periods of five seconds or less and another classifier that operates on event periods of more than five seconds;
  - aggregate multiple security events in the first period of time into a security event dataset, wherein the security event is in the first period of time;
  - determine, based on the second stage classifier operating on the security event dataset associated with the first period of time, a cyberattack on the compute resource; and
- block the cyberattack or one or more subsequent access attempts associated with the cyberattack based on the determination of the cyberattack by the second stage classifier.

14. The non-transitory computer-accessible storage media of claim 13, wherein the one or more processors further execute the executable instructions to:
- determine, based on one or more characteristics of the cyberattack, security policy data.

15. The non-transitory computer-accessible storage media of claim 13, wherein the one or more processors further execute the executable instructions to:
- provide the security policy data to the first stage classifier; and
- determine, by the first stage classifier using the security policy data, a subsequent cyberattack.

16. The non-transitory computer-accessible storage media of claim 13, wherein the first stage classifier is instrumented within a service that receives the one or more access attempts.

17. The non-transitory computer-accessible storage media of claim 13, wherein the plurality of second stage classifiers comprises a plurality of machine learning models trained on security event datasets associated with a plurality of periods of time.

* * * * *